(12) United States Patent
Khripkov et al.

(10) Patent No.: US 9,866,280 B2
(45) Date of Patent: Jan. 9, 2018

(54) MOBILE COMMUNICATION DEVICE WITH WIRELESS COMMUNICATIONS UNIT AND WIRELESS POWER RECEIVER

(71) Applicant: Samsung Electronics Co., Ltd., Suwon-si, Gyeonggi-do (KR)

(72) Inventors: Alexander Nikolaevich Khripkov, Lobnya (RU); Do-won Kim, Suwon-si (KR); Konstantin Alexandrovich Pavlov, Zelenograd (RU); Mikhail Nikolaevich Makurin, Arkhangelsk (RU); Vladimir Yakovlevich Arkhipenkov, Mytishchi (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 111 days.

(21) Appl. No.: 14/717,165

(22) Filed: May 20, 2015

(65) Prior Publication Data

US 2015/0341086 A1    Nov. 26, 2015

(30) Foreign Application Priority Data

May 23, 2014 (RU) .............................. 2014121055
Dec. 5, 2014 (KR) ....................... 10-2014-0174213

(51) Int. Cl.
*H04B 5/00* (2006.01)
*H02J 50/10* (2016.01)
*H02J 50/80* (2016.01)

(52) U.S. Cl.
CPC ............ *H04B 5/0037* (2013.01); *H02J 50/10* (2016.02); *H02J 50/80* (2016.02); *H04B 5/0081* (2013.01)

(58) Field of Classification Search
CPC ............ H02J 7/025; H02J 5/005; H02J 17/00; H04B 5/0037; H01F 38/14
USPC .................. 307/104; 320/108, 137; 455/41.1
See application file for complete search history.

(56) References Cited

U.S. PATENT DOCUMENTS

| | | | |
|---|---|---|---|
| 8,050,068 B2 | 11/2011 | Hussmann et al. | |
| 8,093,758 B2 | 1/2012 | Hussmann et al. | |
| 8,144,066 B2 | 3/2012 | Parsche | |
| 8,410,637 B2 | 4/2013 | Karaoguz et al. | |
| 8,441,154 B2 | 5/2013 | Karalis et al. | |
| 8,452,235 B2 | 5/2013 | Kirby et al. | |

(Continued)

FOREIGN PATENT DOCUMENTS

| | | | | |
|---|---|---|---|---|
| KR | WO 2013180399 A1 | * | 12/2013 | ............ H04B 5/0037 |
| WO | WO 2013165421 A1 | * | 11/2013 | ............ H01Q 1/2266 |

*Primary Examiner* — Stephen W Jackson
*Assistant Examiner* — David M Stables
(74) *Attorney, Agent, or Firm* — Jefferson IP Law, LLP

(57) ABSTRACT

A mobile communication device having a wireless power receiver and wireless communications unit, in which inductors of the communications unit and the power receiver are in close proximity to each other, is provided. The mobile communication device includes a wireless communications unit including a first inductor configured to transmit and receive data via inductive coupling, and a wireless power receiver. The wireless power receiver includes a second inductor which is disposed above the first inductor and receives power via inductive coupling, a ferrite shield disposed between the first inductor and the second inductor, and a compensator disposed between the first inductor and the ferrite shield. Compensator is adapted to compensate for variations in the inductance of the first inductor caused by the ferrite shield.

17 Claims, 21 Drawing Sheets

(56) References Cited

U.S. PATENT DOCUMENTS

| | | |
|---|---|---|
| 8,466,583 B2 | 6/2013 | Karalis et al. |
| 2005/0085873 A1 | 4/2005 | Gord et al. |
| 2009/0085408 A1 | 4/2009 | Bruhn |
| 2010/0190436 A1 | 7/2010 | Cook et al. |
| 2010/0194335 A1 | 8/2010 | Kirby et al. |
| 2012/0153743 A1 | 6/2012 | Shichino |
| 2012/0293006 A1 | 11/2012 | Kim et al. |
| 2013/0038278 A1 | 2/2013 | Park et al. |
| 2013/0126622 A1* | 5/2013 | Finn ................. G06K 19/07771 235/492 |
| 2013/0267170 A1 | 10/2013 | Chong et al. |
| 2015/0171519 A1* | 6/2015 | Han .................... H04B 5/0037 343/720 |
| 2015/0303561 A1* | 10/2015 | Yang .................... H01Q 1/2266 343/842 |

\* cited by examiner

MOBILE COMMUNICATION DEVICE WITH WIRELESS COMMUNICATIONS UNIT AND WIRELESS POWER RECEIVER

CROSS-REFERENCE TO RELATED APPLICATION(S)

This application claims the benefit under 35 U.S.C. §119(a) of a Russian patent application filed on May 23, 2014 in the Russian Federal Service for Intellectual Property and assigned Ser. No. 2014121055, and of a Korean patent application filed on Dec. 5, 2014 in the Korean Intellectual Property Office and assigned Ser. No. 10-2014-0174213, the entire disclosure of each of which is hereby incorporated by reference.

TECHNICAL FIELD

The present disclosure relates to mobile technology. More particularly, the present disclosure relates to a mobile communication device having a wireless communications unit and a wireless power receiver, in which inductors of the communications unit and the power receiver are in close proximity to each other.

BACKGROUND

Modern mobile communication devices incorporate multiple wireless interfaces. Compact dimensions of these devices cause problems with accommodating antennas, transmitters and other components inside them. Components of a mobile communication device, such as a wireless power receiver and a wireless communications unit, require a large area to accommodate inductors. A solution in this case is to dispose one inductor within the other. However, a ferrite shield of one inductor may induce variation in parameters of the other. This provokes a mismatch between the second inductor and a transceiver and affects the operation of the device.

Such impact can be taken into account where all components inside a single device are being designed at the same time. However, a simultaneous match is difficult to achieve when it is required to mount a wireless power receiver and a wireless communications unit produced by different manufacturers or when these components must operate both together and separately.

An example of this case is a mobile communication device which comprises an integrated wireless communications unit, while a wireless power receiver is mounted on a removable lid of the device housing. In this case, inductance of the wireless communications unit inductor will grow near the ferrite shield of the wireless power receiver, and as a consequence, operation of the wireless communications unit may be impaired.

U.S. Patent Application Publication Number 20100190436 A1, published on Jul. 29, 2010, U.S. Patent Application Publication Number 20050085873 A1, published on Apr. 21, 2005, U.S. Patent Application Publication Number 20090085408 A1, published on Apr. 2, 2009, U.S. Patent Application Publication Number 20120293006 A1, published on Nov. 22, 2012, and U.S. Pat. No. 8,144,066 A1, published on Aug. 26, 2010, describe concurrent operation of a wireless power transmission (WPT) system and a wireless near field communication (NFC) system at the same frequency. Currently, WPT and NFC systems operate on different frequencies. Alliance for Wireless Power (A4WP) Technical Specification (see http://www.a4wp.org) provides for operation of wireless power devices at 6.78 MHz, while the NFC operating frequency is 13.56 MHz. The devices described in the above documents do not support operation at two different frequencies.

Another method, described by Dionigi M., Mongiardo M., "Multi band resonators for wireless power transfer and near field magnetic communications", Microwave Workshop Series on Innovative Wireless Power Transmission: Technologies, Systems, and Applications (IMWS), Institute of Electrical and Electronics Engineers (IEEE) 2012 Microwave Theory and Techniques Society (MTT-S) International, Kyoto, 2012, comprises using a resonator with multiple natural frequencies for concurrent operation in two bands. The method assumes that WPT and NFC systems are incorporated in a single device, so the method cannot be used in existing devices where an NFC system can be already integrated, while WPT system is mounted on a removable lid.

Literature relating to this issue predominantly describes methods of providing wireless power reception concurrently with wireless data transfer through integration of WPT system and wireless data transfer system together in a single device such that they cannot be separated from the device. No description of a method providing WPT and NFC systems which are capable of operating both together and separately has been found.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a mobile communication device having a wireless communications unit and a wireless power receiver which is capable of preventing variations in the inductance of an inductor when an inductor of the wireless communications unit and the wireless power receiver are in close proximity to each other.

In accordance with an aspect of the present disclosure, a mobile communication device is provided. The mobile communication device includes a wireless communications unit configured to transmit and receive data using a first inductor, a wireless power receiver configured to receive power wirelessly using a second inductor disposed above the first inductor, a ferrite shield configured to be disposed between the first inductor and the second inductor, and a compensator configured to be disposed between the first inductor and the ferrite shield, and to compensate for inductance of the first inductor.

The first inductor and the second inductor may be formed in a plate.

The ferrite shield may have an internal space where a magnetic field generated from the first inductor is passed, and an internal space in the ferrite shield may be located corresponding to the first inductor.

Dimensions of an internal space in the ferrite shield may be smaller than outer dimensions of the first inductor, and larger than internal dimensions of the first inductor.

The compensator may have an internal space where a magnetic field generated from the first inductor is passed, and an internal space in the compensator may be located corresponding to the first inductor.

Dimensions of an internal space in the compensator may be a maximum size which completely isolates the mobile communication device from a magnetic field of the second inductor.

Distances between edges of an internal space in the compensator and external edges of the first inductor may be determined based on a condition of constancy of the first inductor.

Dimensions of the compensator may be larger than dimensions of the ferrite shield.

The compensator may be formed of a copper foil having a thickness of 10-50 μm.

The compensator may be made of a conductive material.

The conductive material may be copper or aluminum.

The mobile communication device may further include a battery, and the first inductor may be mounted on the battery.

The mobile communication device may further include a ferrite sheet configured to be disposed between the battery and the first inductor, and to prevent a change of magnetic field of the first inductor by the battery.

The mobile communication device may further include a removable lid, and the wireless power receiver, the ferrite shield and the compensator may be mounted on the inner surface of the removable lid.

The wireless communications unit and the wireless power receiver may be adapted to operate at a different frequency.

The wireless communications unit and the wireless power receiver may be adapted to operate at a different frequency.

The wireless communications unit may be adapted to operate at a frequency of 13.56 MHz, and the wireless power receiver may be adapted to operate at a frequency of 6.78 MHz.

The wireless communications unit may perform a communication based on Near Field Communication (NFC) technology.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
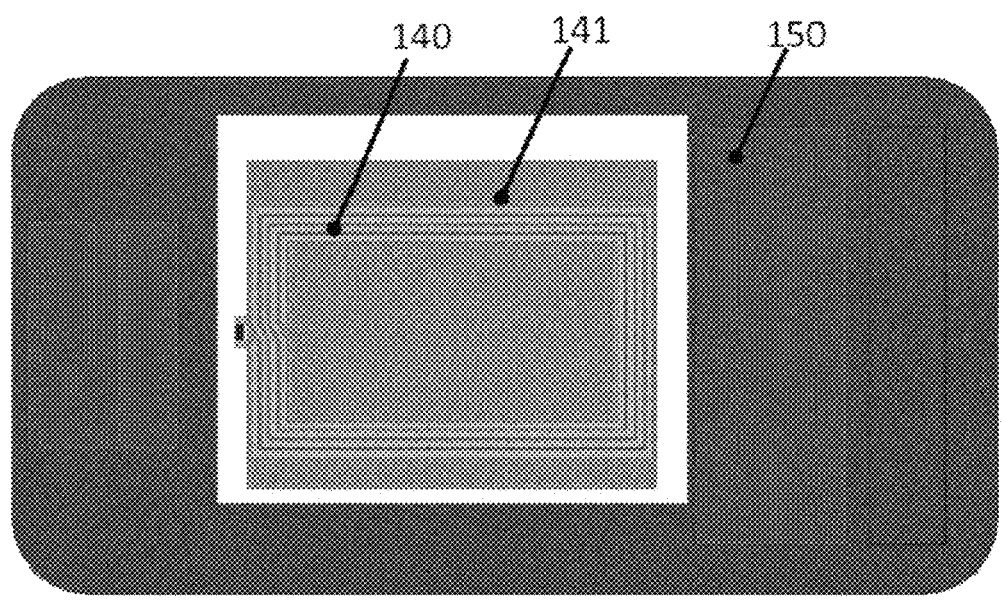
FIG. 1A is a plan view of a mobile communication device, in which a wireless communications unit is integrated, without a removable lid, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, the term "wireless communications unit" is used herein to mean a device that combines functions of wireless transmission and reception of data via inductive coupling. In an embodiment of the present disclosure, a wireless communications unit is based on wireless Near Field Communication (NFC) technology according to the related art. Therefore, this particular type of wireless transceiver device will be discussed hereinafter. However, it should be understood that other types of wireless communications units using inductive coupling are also included in the scope of the present disclosure.

Another term "wireless power (WPR) receiver", also used herein, defines a device capable of wirelessly receiving power via inductive coupling.

The present disclosure relies on the use of a compensator for adjusting the impedance of the NFC unit inductor.

As is known, if extraneous conductive components or components that have soft magnetic properties are proximate to an inductor, impedance of the NFC inductor varies. For example, inductance of the NFC unit inductor increases when the ferrite shield of the WPR receiver is disposed proximate thereto. Variation in the NFC inductor impedance gives rise to a mismatch in the NFC unit circuit.

In the present structure, the provision of a compensator reduces the inductance of the NFC inductor to the initial value that was prior to placing the ferrite shield proximate to it. The effect is provided by the fact that currents induced in the compensator generate a magnetic field having the direction opposite to that of the magnetic field generated by the NFC inductor, thereby reducing magnetic flux through the inductor surface, which corresponds to a reduction in the inductance.

Therefore, the present structure prevents variation in the inductance of an NFC inductor when a WPR receiver with a ferrite shield is placed proximate to it. In this case, operation of the NFC circuit will not be impaired in the presence or absence of WPR receiver. Furthermore, the present design slightly distorts the initial field generated by NFC inductor in the absence of WPR receiver.

FIG. 1A is a plan view of a mobile communication device, in which a wireless communications unit is integrated, without a removable lid, according to an embodiment of the present disclosure.

FIG. 1A schematically shows an NFC unit integrated in a housing of a mobile communication device 150. The NFC unit comprises an NFC inductor 140 and a ferrite sheet 141 to shield the NFC inductor 140 from a battery, which is also accommodated in the housing of the mobile communication device 150.

That is, the wireless communications unit transmits and receives data using the first inductor.

The ferrite sheet 141 may be disposed between a battery 142 and the NFC inductor 140, and prevent a change of magnetic field of the first inductor by the battery 142.

Figure 1B:
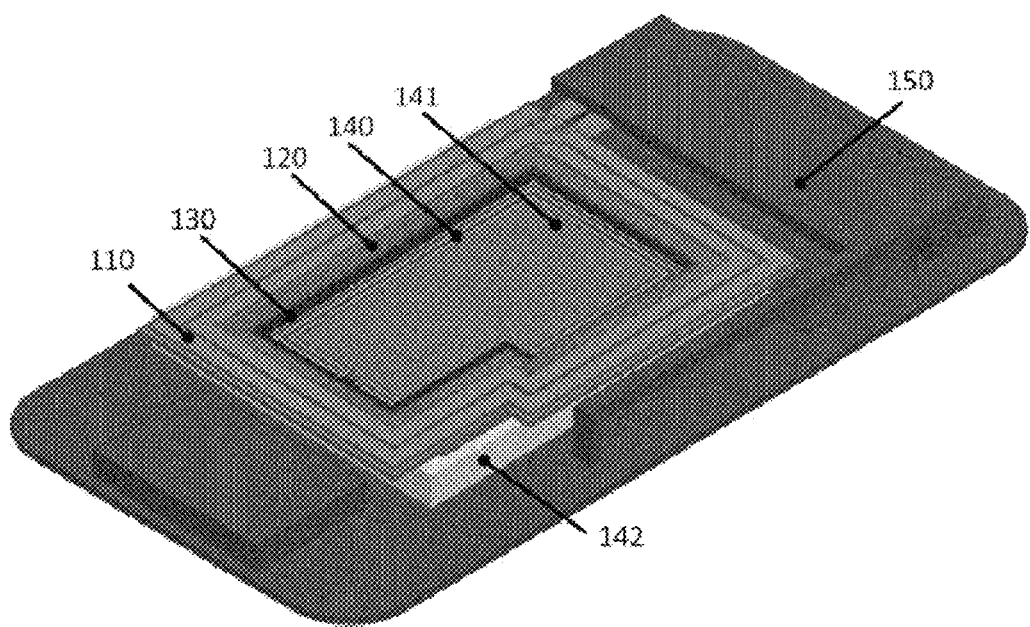
FIG. 1B is an isometric view of a mobile communication device without a removable lid, in which a wireless power receiver is mounted on the integrated wireless communications unit according to an embodiment of the present disclosure.

FIG. 1B is an isometric view of the mobile communication device 150 with a removable WPR receiver and an integrated NFC unit according to an embodiment of the present disclosure. The WPR receiver comprises a substrate (not shown), on which a WPR inductor 110, a ferrite shield 120 and a compensator 130 are formed. In an embodiment of the present disclosure, a WPR receiver together with its components can be mounted on a removable lid 160 of the mobile communication device 150 (see FIG. 4).

That is, the WPR receiver receives power wirelessly using the second inductor disposed above the first inductor.

The ferrite shield 120 is disposed between the first inductor and the second inductor.

The compensator 130 is disposed between the first inductor and the ferrite shield, and compensate for the inductance of the first inductor.

The NFC inductor 140 may be mounted on the battery 142.

Figure 2:
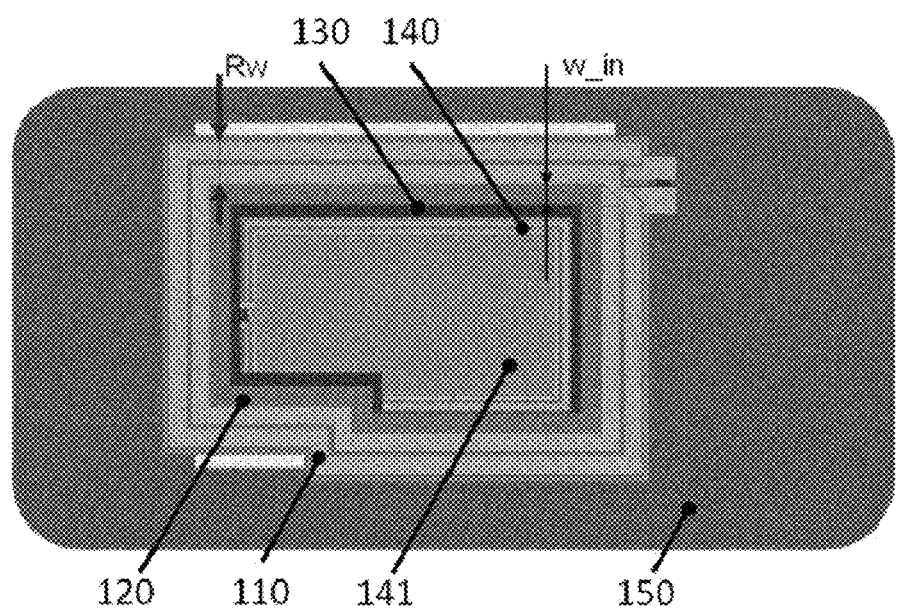
FIG. 2 is a plan view of a device of FIG. 1B, showing the size of the ferrite shield and the width of the wireless power receiver inductor according to an embodiment of the present disclosure.

FIG. 2 shows parameters that should be taken into account when designing a WPR receiver according to an embodiment of the present disclosure.

In particular, symbol w_in denotes the width of the ferrite shield 120, and symbol Rw denotes the width of the WPR inductor 110. Optimization of selection of values of these parameters is discussed below.

Figure 3:
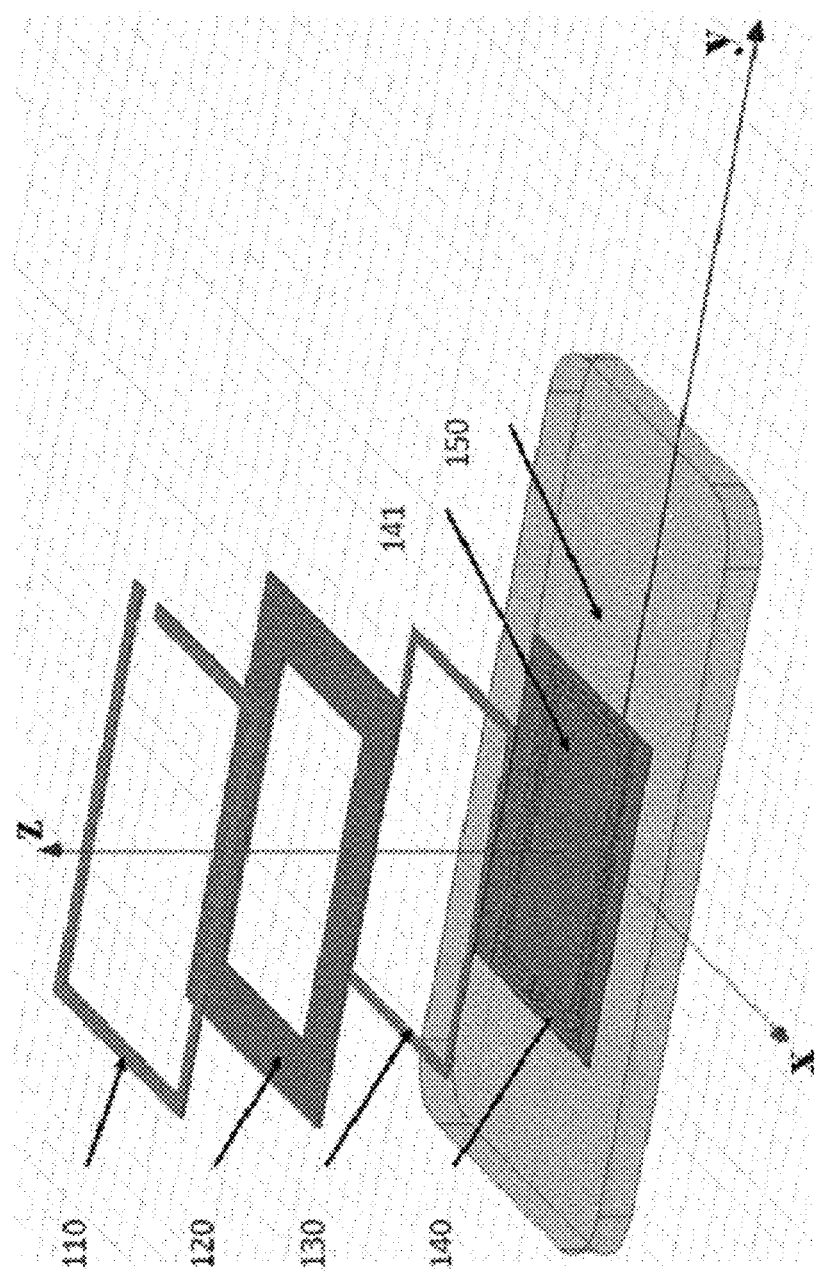
FIG. 3 is an exploded view of the structure of a wireless communications unit and a wireless power receiver mounted together according to an embodiment of the present disclosure.

FIG. 3 shows an exploded view of the structure of the WPR receiver and the NFC unit mounted together according to an embodiment of the present disclosure.

Ferrite shield 120 has an internal space in the center to allow the use of the NFC inductor 140 unmodified. That is, the ferrite shield 120 may have an internal space where magnetic field generated from the first inductor is passed.

The internal space in the ferrite shield 120 may be located corresponding to the NFC inductor 140. To be specific, internal space in the ferrite shield 120 may be formed by placing the NFC inductor 140 in the center, and the distance from the NFC inductor 140 to the internal space in the ferrite shield 120 may be consistent.

Dimensions of the internal space in the center of the ferrite shield 120 will be discussed in detail below.

The ferrite shield 120 increases the inductance of the NFC inductor 140. In an embodiment of the present disclosure, inductance of the NFC inductor 140 decreases in the presence of a compensator 130, part of the WPR receiver.

In accordance with the present disclosure, the compensator 130 may be disposed between the ferrite shield 120 and the NFC inductor 140.

In various embodiments of the present disclosure, the compensator 130 is formed of copper foil disposed on the inner side of a removable lid 160 of the mobile communication device 150.

Meanwhile, the internal space may be also referred to as a "cutout".

Figure 4:
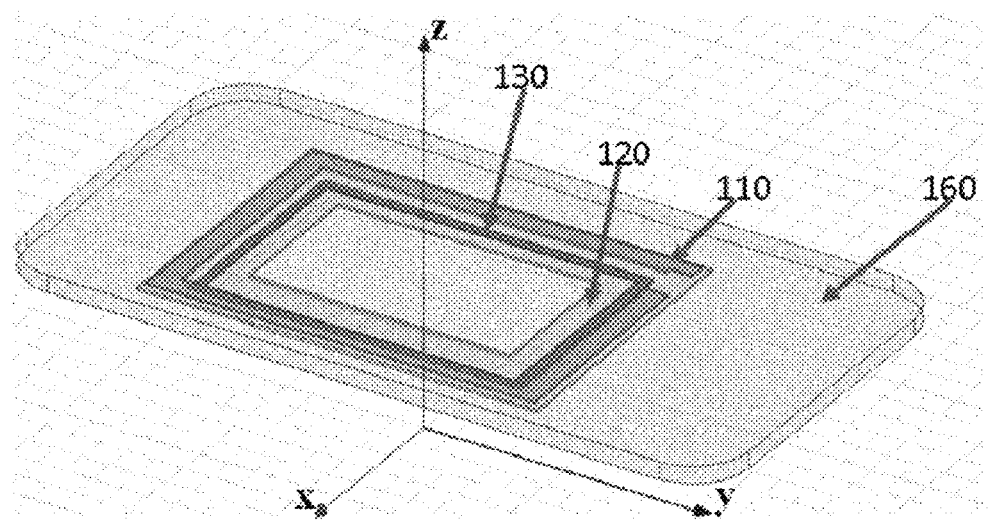
FIG. 4 is a structure of the removable lid of the mobile communication device with a wireless power receiver according to an embodiment of the present disclosure.

FIG. 4 illustrates a structure of the removable lid 160 of the mobile communication device 150 with the WPR receiver according to an embodiment of the present disclosure.

Now consider parameters of the NFC inductor 140 in two cases, namely without and with WPR inductor 110 and ferrite shield 120 mounted on removable lid 160. Normal operation of the NFC unit will be ensured if the NFC inductor 140 has the same inductance in both cases. In turn, the WPR inductor 110 must have a ferrite shield 120 to provide a sufficiently high mutual inductance with an external wireless power transmitter in the presence of a massive conductive object such as the mobile communication device 150.

In an embodiment of the present disclosure, the compensator 130 may be configured as a frame. The frame provides close magnetic field distribution of the NFC inductor 140 with and without WPR inductor 110 and ferrite shield 120.

The internal space in the ferrite shield 120 may pass a magnetic field generated from the NFC inductor to outside of the device.

Distances from the internal space in the compensator 130 to the edges of the NFC inductor 140 (see FIG. 2) may be symmetrical or asymmetrical. These parameters are determined based on the condition of constancy of the NFC inductor inductance. Also, the distances from the edges of the internal space in the compensator 130 to the external edges of the NFC inductor 140 are determined based on the condition of constancy of the NFC inductor 140.

In an embodiment of the present disclosure, the compensator 130 is made of a material with high conductivity.

In an embodiment of the present disclosure, the compensator 130 is made of copper or aluminum.

In accordance with the present disclosure, the compensator 130 is mounted on a removable lid 160 of the mobile communication device 150 with the WPR receiver (see FIG. 4). Replacement of the removable lid 160 of the mobile communication device 150 removes the ferrite shield 120 and the compensator 130. Thus, inductance of the NFC inductor 140 stays constant with and without the removable lid 160 of the mobile communication device 150.

In an embodiment of the present disclosure, the compensator 130 is disposed between the battery 142 (see FIG. 1B) and the ferrite shield 120 to isolate the battery 142 and other components of the mobile communication device 150 from magnetic field. Thus, components of mobile communication devices are protected against possible adverse effect of the magnetic field generated in the process of wireless power transmission.

In an embodiment of the present disclosure, the WPR inductor 110 and the NFC inductor 140 are formed in a plate.

Ferrite shield 120 has an internal space in the center above the NFC inductor 140 to minimize magnetic field distribution from the NFC inductor 140 outside the mobile communication device 150.

Further, a method of designing a wireless power receiver on removable lid 160 of the mobile communication device 150, which coexists with an NFC unit integrated in the mobile communication device 150, will be described.

At a first operation, initial parameters should be determined, namely bandwidths of power transmission/reception and data transmission/reception, and dimensions and relative arrangement of the WPR inductor 110 and the NFC inductor 140.

The present structure can be used, for example, in mobile communication devices. In this case, according to Alliance for Wireless Power (A4WP)-Consortium specification, the following standard frequencies are used, namely 6.78 MHz for WPR receiver and 13.56 MHz for NFC unit.

At the next operation, structures of the WPR inductor 110 and the ferrite shield 120 should be optimized for required parameters of wireless power transmission. Consider the following ferrite shield 120:

Dimensions: 51×70 mm;
Internal space in the center for NFC inductor;
Width of ferrite: 10 mm;
Thickness: 0.5 mm-0.6 mm;
Relative magnetic permeability of ferrite shield 120 at 13.56 MHz; and
Distance between ferrite shield 120 and NFC inductor 140: 0.5 mm.

The internal space in the ferrite shield 120 is positioned over the NFC inductor 140 to avoid weakening the magnetic field from the NFC inductor. On the other hand, the ferrite shield 120 should be optimized to improve the efficiency of wireless power transmission.

Figure 5A:
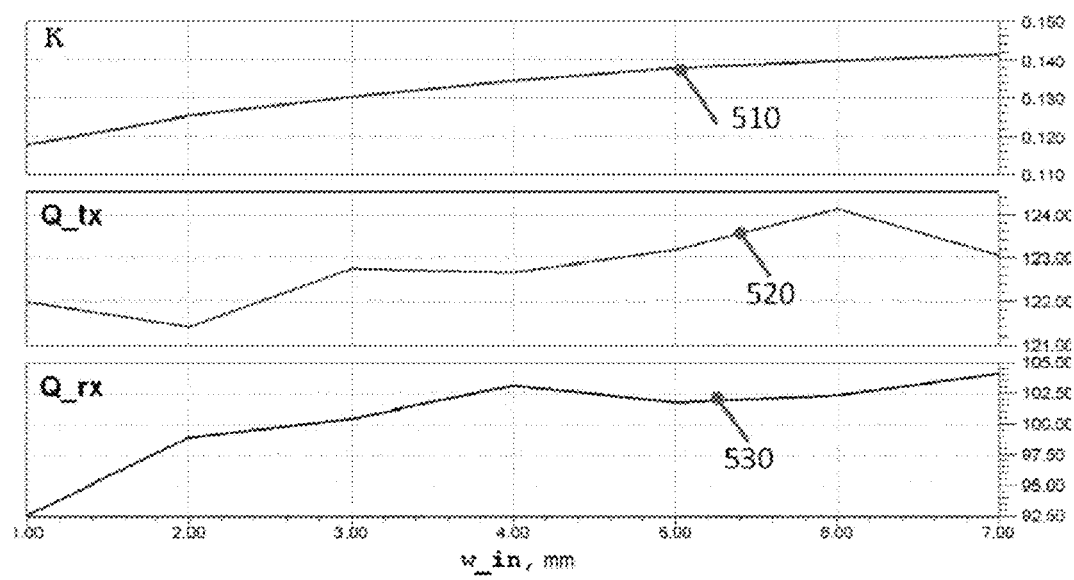
FIG. 5A shows plots of wireless power transfer parameters as function of dimensions of the ferrite shield of the wireless power receiver according to an embodiment of the present disclosure.

FIG. 5A shows the dependence of the inductive coupling coefficient (K) on dimensions of the ferrite shield 120 (w_in in FIG. 2). K 510 and Q factor 530 of WPT inductor (Q_rx) increase with w_in up to a certain level of saturation according to an embodiment of the present disclosure. FIG. 5A also shows the dependence of Q factor 520 of transmitter inductor (Q_tx), i.e., outer inductor, which transmits power to WPT inductor, on the size of w_in.

In an embodiment of the present disclosure, the ferrite shield 120 may have an internal space where a magnetic field is passed, and the internal space in the ferrite shield 120 may be located corresponding to the first inductor.

In an embodiment of the present disclosure, dimensions of the internal space may be slightly smaller than the outer dimensions of the NFC inductor 140.

Also, dimensions of the internal space in the ferrite shield 120 may be larger than the internal dimensions of the NFC inductor 140.

At the next operation of optimization of the WPR inductor 110, the inductor width is adjusted and the number of turns is chosen.

Figure 5B:
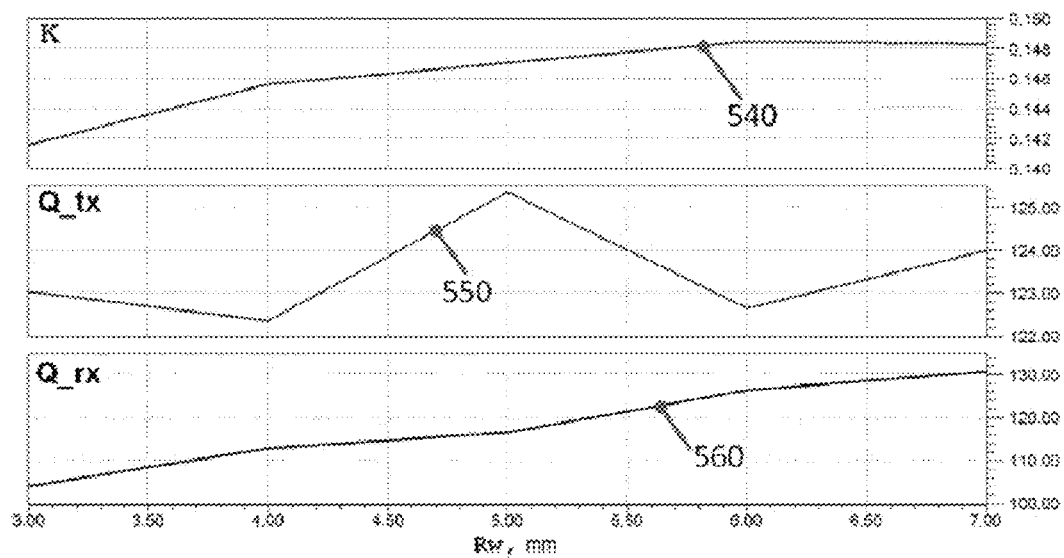
FIG. 5B shows plots of wireless power transfer parameters as function of width of the wireless power receiver inductor according to an embodiment of the present disclosure.

FIG. 5B shows the dependence of K and Q_rx on the width (see Rw in FIG. 2) according to an embodiment of the present disclosure.

Increase in width Rw leads to increase in the K 540 and Q_rx 560. Increase in Q_rx is caused by a more rapid decrease of resistance, than inductance. FIG. 5B also shows the dependence of Q_rx 550 of Q_tx on width Rw.

At the next operation, distribution of magnetic field intensity should be optimized.

Figure 6:
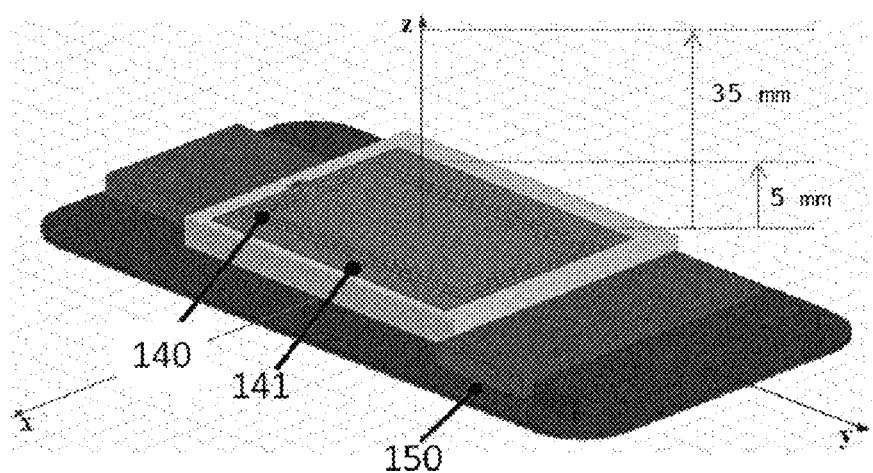
FIG. 6 shows position of the axis orthogonal to the mobile communication device (Z-axis), in the direction of which the magnetic field distribution must be tested according to an embodiment of the present disclosure.

FIG. 6 illustrates the position of an axis orthogonal to the mobile device (Z-axis), in the direction of which magnetic field distribution should be tested according to an embodiment of the present disclosure.

Figure 7:
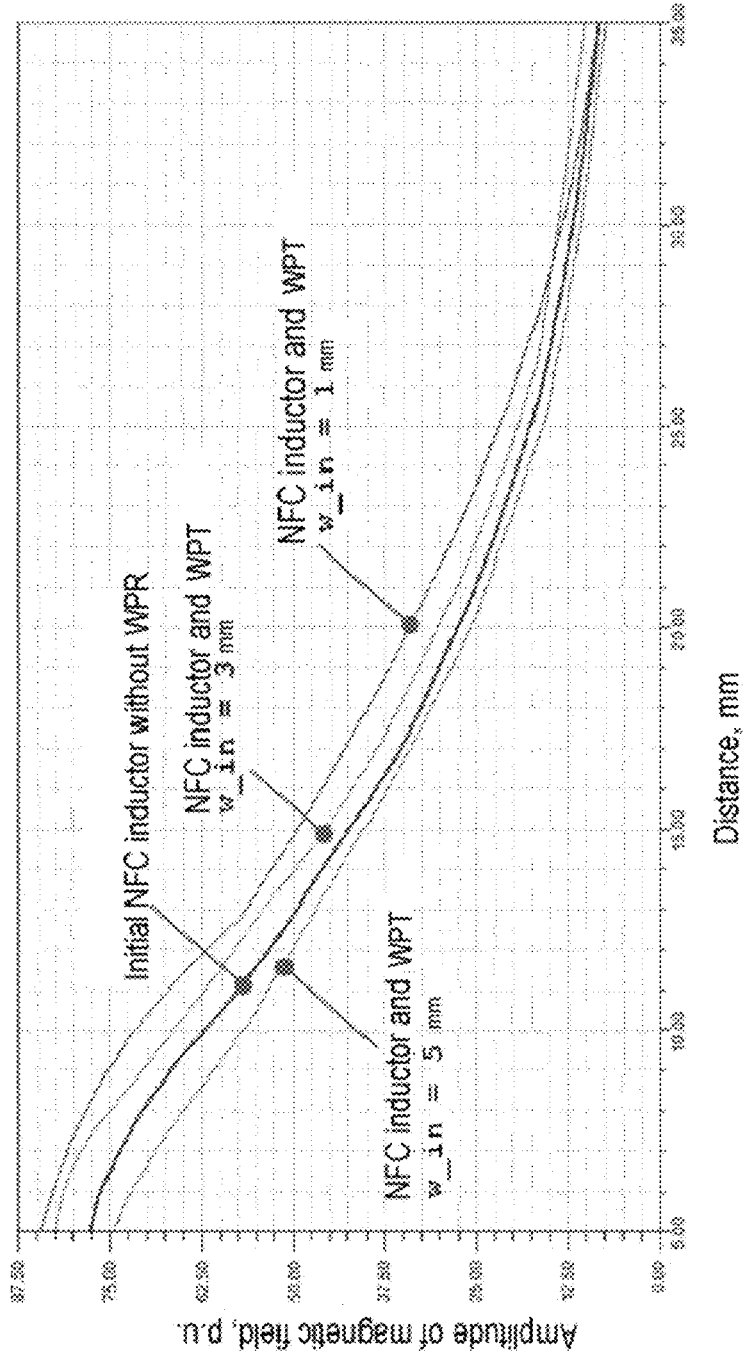
FIG. 7 shows a plot of amplitude of the magnetic field generated by the wireless communications unit inductor as function of distance along Z-axis for the case where only the wireless communications unit inductor is provided according to an embodiment of the present disclosure, and for the case where wireless communications unit inductor, wireless power receiver inductor and a ferrite shield (internal ferrite dimensions w_in=1 mm, 3 mm, 5 mm) are provided.

FIG. 7 shows amplitudes of the magnetic field generated by the NFC inductor 140 as function of the distance along Z-axis according to an embodiment of the present disclosure for the following cases:

amplitude of magnetic field of NFC inductor without WPR receiver; and
amplitude of magnetic field of NFC inductor with WPR receiver (w_in=1 mm, 3 mm, 5 mm).

Referring to FIG. 7, intensity of magnetic field of the NFC inductor 140 is greatly reduced if the ferrite shield 120 substantially covers the NFC inductor (w_in=5 mm) Otherwise, the field intensity is not dependent on the size of the internal space in the ferrite shield 120.

In an embodiment of the present disclosure, dimensions of the internal space in the ferrite shield 120 may be slightly smaller than the outer dimensions of the NFC inductor 140 (w_in=3 mm is optimal in this case). Ferrite shield 120 with the internal space allows using the inductor unmodified.

At the next operation, dimensions of the compensator 130 are optimized to compensate for mismatch of the inductance of NFC inductor 140. In this example, the compensator 130 is a frame of copper foil disposed inside the perimeter of the battery 142 and above it (see FIGS. 2 and 3). The compensator 130 may be formed of a copper foil having a thickness of 10-50 μm.

Figure 8:
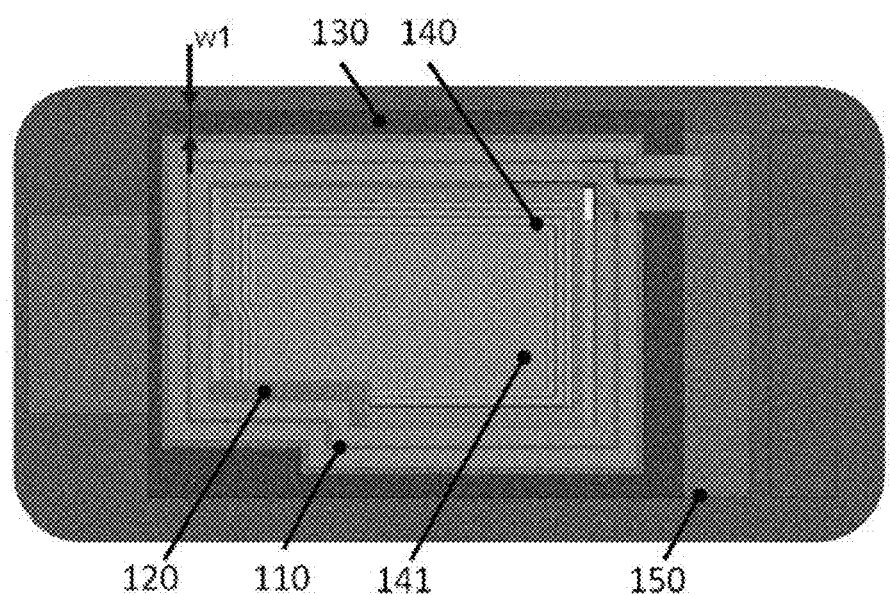
FIG. 8 shows a structure of a compensator of the wireless power receiver according to an embodiment of the present disclosure.

FIG. 8 shows a structure of a compensator of the wireless power receiver according to an embodiment of the present disclosure.

In various embodiments of the present disclosure, dimensions of the compensator 130 may be greater than those of the ferrite shield 120 as shown in FIG. 8.

Increasing the size of wl (i.e., the width of the compensator 130) has a little effect on the impedance of the NFC inductor 140. Primarily, with increasing the external dimensions of the compensator 130, currents induced by the WPR inductor 110 in components of the mobile communication device 150 decrease.

Thus, optimization of parameter wl allows components of the mobile communication device 150 to be protected from potential harmful effect of the magnetic field generated in the process of wireless power transfer. Optimal wl value can be determined by measuring Q factor of the WPR inductor 110 at different wl values. It should be noted that wl parameter influences the inductance of WPR inductor 110. Impedance matching of WPR receiver is performed upon completion of the procedure on the compensator 130.

Geometry of the internal space in the compensator 130 is determined based on the required impedance value of NFC inductor 140. Internal dimensions of the internal space should be optimized such that to compensate for mismatch of the NFC inductor 140. At this operation, optimization of the compensator 130 is performed in the presence of ferrite shield 120.

Figure 9A:
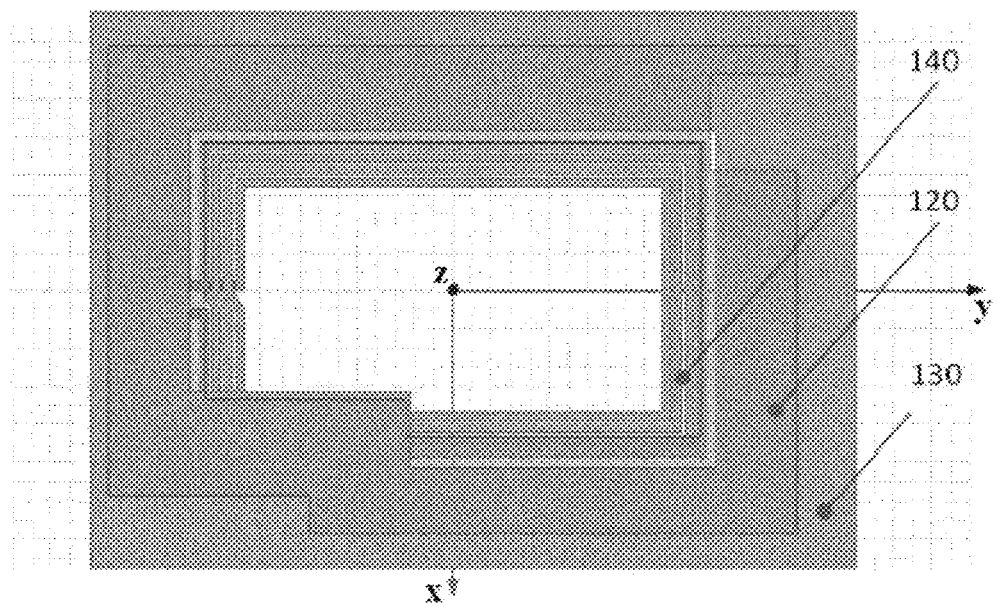
FIGS. 9A, 9B, and 9C illustrate the selection of geometry of the internal space in the compensator to compensate for variation in the inductance of the wireless communications unit inductor according to various embodiments of the present disclosure.
Figure 9B:
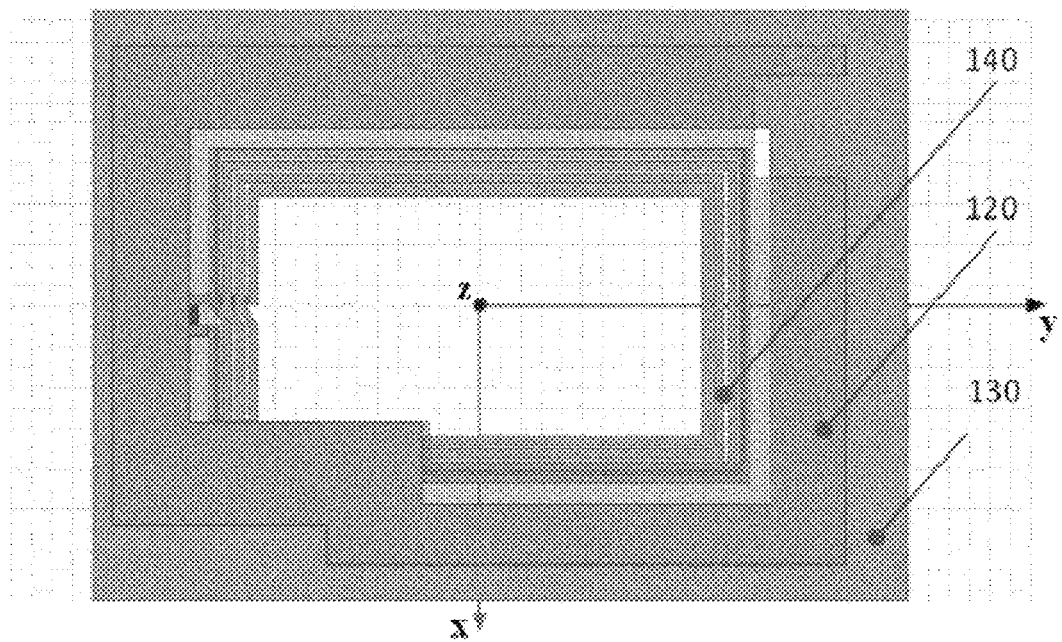
Figure 9C:
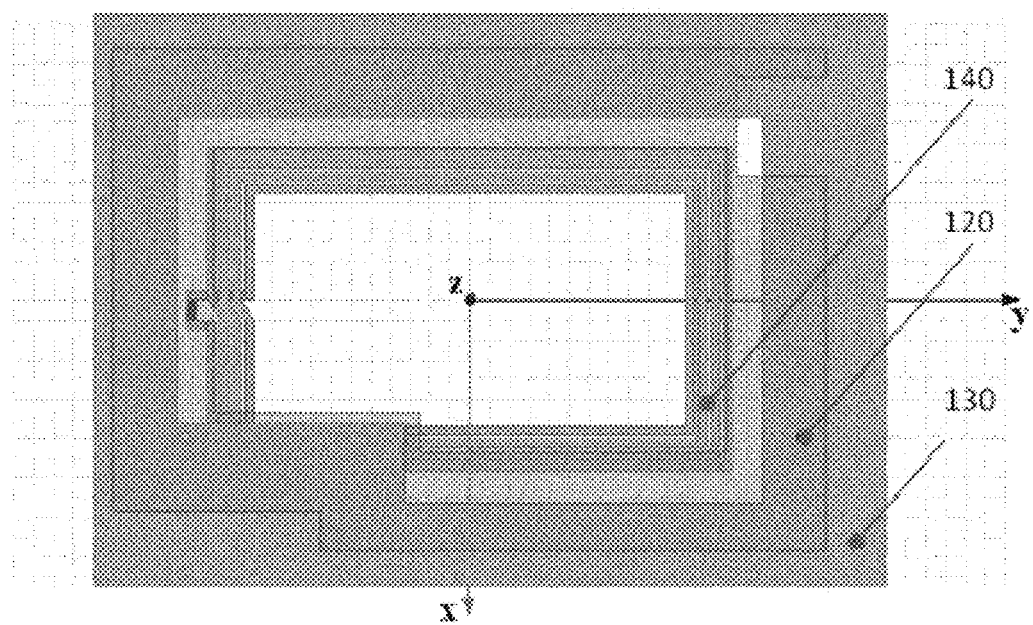

Operations of optimization of the internal space in the compensator 130 are shown in FIGS. 9A through 9C.

FIGS. 9A to 9C illustrate the selection of geometry of the internal space in the compensator to compensate for variation in the inductance of the wireless communications unit inductor according to various embodiments of the present disclosure.

The compensator 130 may have an internal space where a magnetic field generated from the first inductor is passed. Also, the internal space in the compensator 130 may be located corresponding to the first inductor.

A larger area of the internal space corresponds to a greater inductance of the NFC inductor 140.

Furthermore, a larger internal space provides a greater magnetic flux from the WPR inductor 110 through the mobile communication device 150. Thus, a larger internal space size reduces Q factor of the WPR inductor 110. There is a certain minimum size of the internal space in the compensator 130, which completely isolates a magnetic field of the WPR inductor 110 from the mobile communication device 150 (see FIG. 9B). With a further decrease in the internal space, the Q factor of WPR inductor 110 does not increase. It should be noted that the use of a WPR inductor 110 with ferrite shield 120 decreases Q factor of NFC inductor 140.

Final operation involves evaluation of parameters of wireless power transmission and evaluation of parameters of wireless data transmission. Adjustment of the WPR inductor 110 is carried out in the presence of a compensator 130.

Compensator 130 can give rise to 5% inductance mismatch of WPR inductor 110 and about 10% variation in Q factor (depending on the relative position of inductors and the mobile device).

Thus, the final operation should include fine adjustment of impedance match of matching circuit capacitors of WPR receiver.

Experimental testing is carried out to confirm the absence of a mismatch in NFC inductor 140. Impedance of the NFC inductor 140 is measured under the following conditions:
   WPR receiver is fixed on the mobile phone. Phone battery has an integrated NFC sensor.
   Output contacts of the NFC sensor are isolated from the phone; a circuit analyzer is connected to contacts to measure impedance.
   Compensator of copper foil is placed above the integrated NFC sensor such that to compensate for a mismatch.

Figure 10:
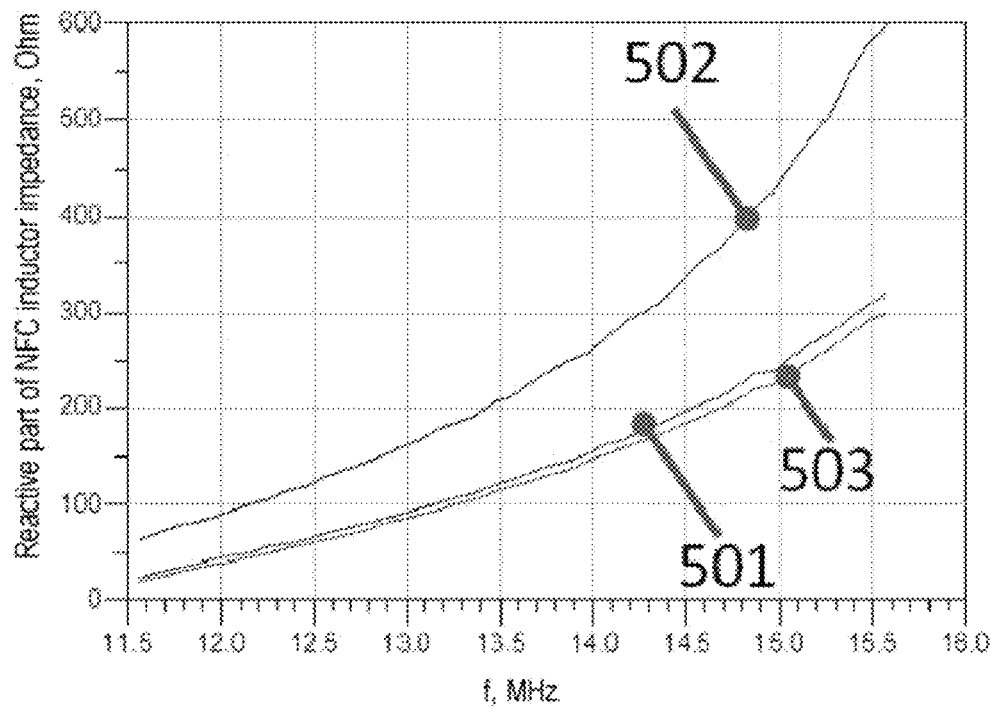
FIG. 10 shows impedance mismatch caused by the presence of the wireless power receiver inductor proximate to the wireless communications unit inductor according to an embodiment of the present disclosure.
Figure 10:
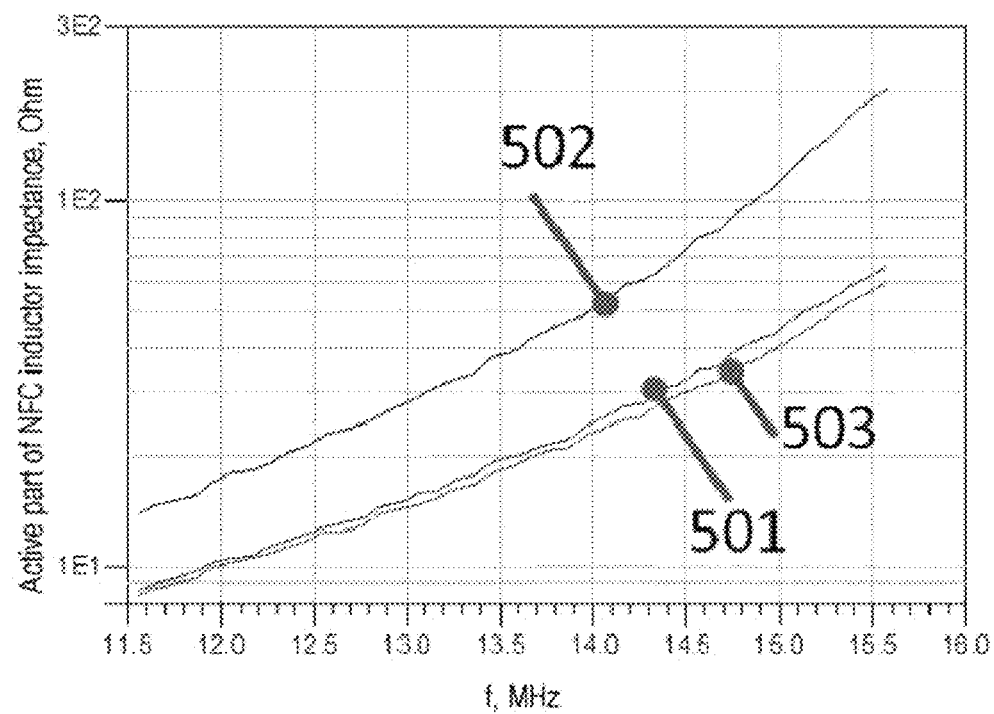

FIG. 10 shows experimentally measured frequency relations of real and imaginary parts of the NFC inductor impedance for three cases according to an embodiment of the present disclosure:
   501—NFC inductor without WPR receiver;
   502—NFC inductor with WPR receiver; no compensation for mismatch; and
   503—NFC inductor with WPR receiver; compensator 130 is used.

According to the experimental results, a mismatch of the NFC inductor 140 is fully compensated by the compensator 130.

Figure 11:
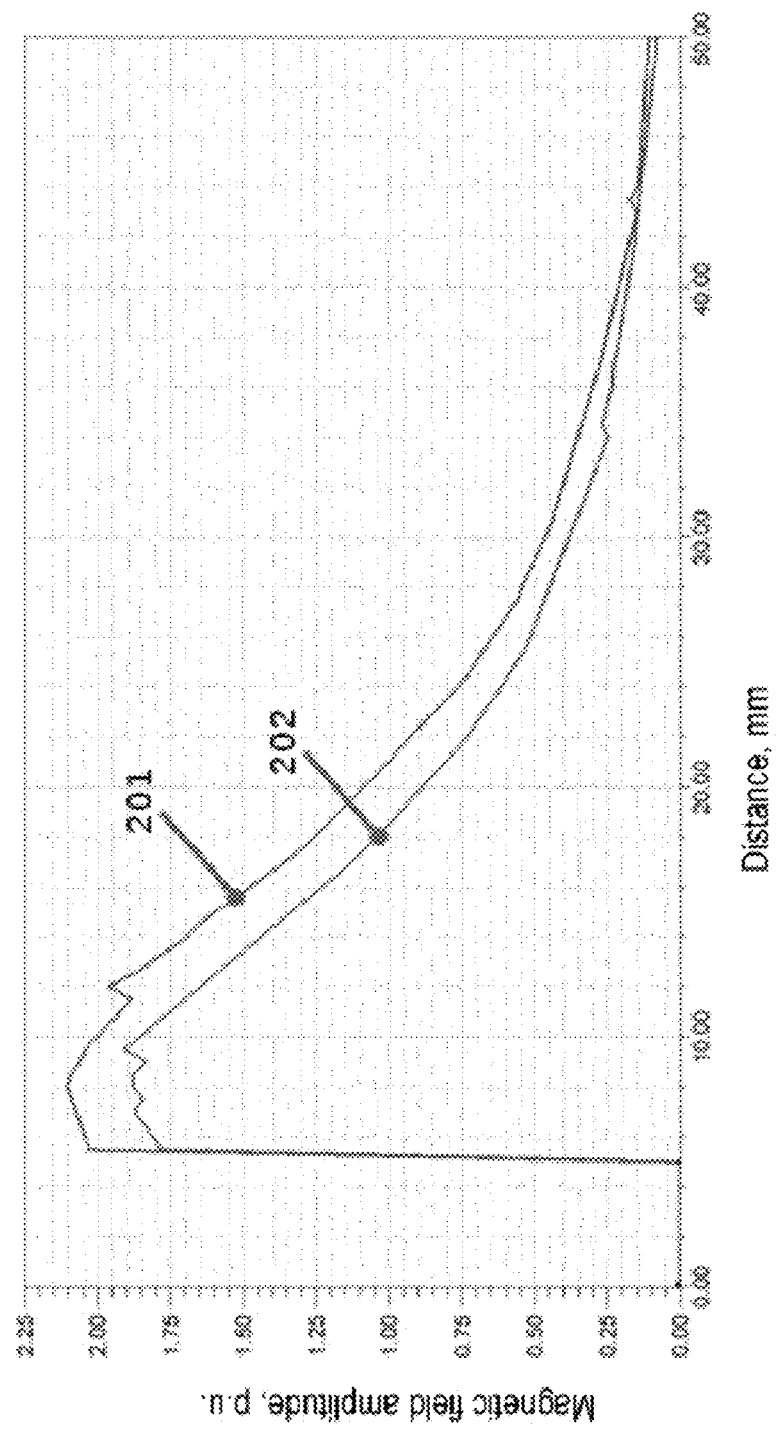
FIG. 11 shows distribution of magnetic field Z-component above the mobile device according to an embodiment of the present disclosure.
Figure 12A:
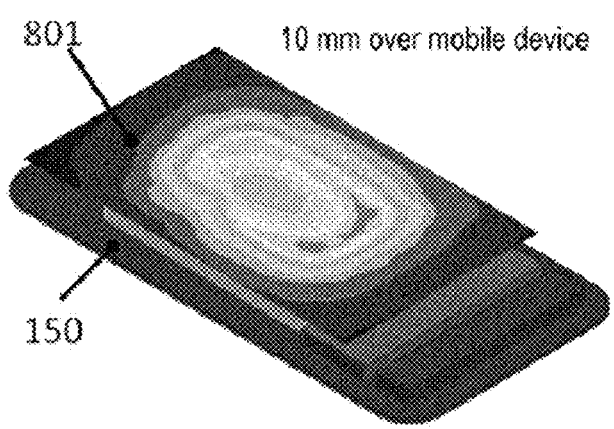
FIGS. 12A, 12B, 12C, and 12D show magnetic field distribution in a plane parallel to the surface of the mobile communication device for various distances from the mobile communication device along Z-axis according to various embodiments of the present disclosure.
Figure 12B:
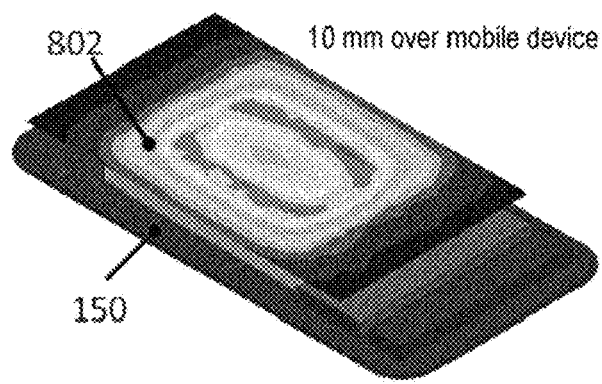
Figure 12C:
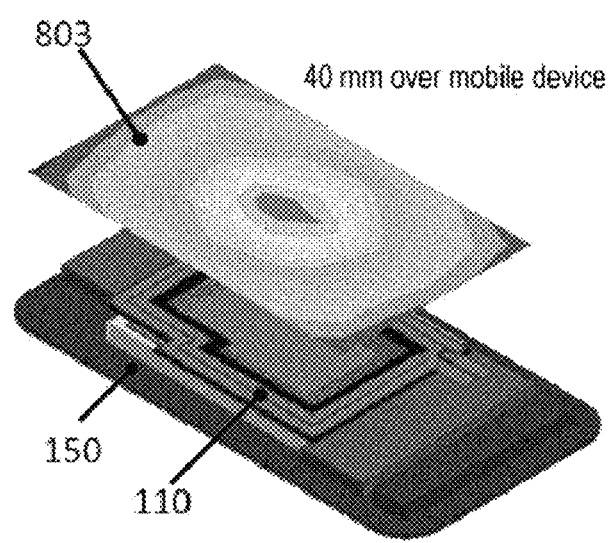
Figure 12D:
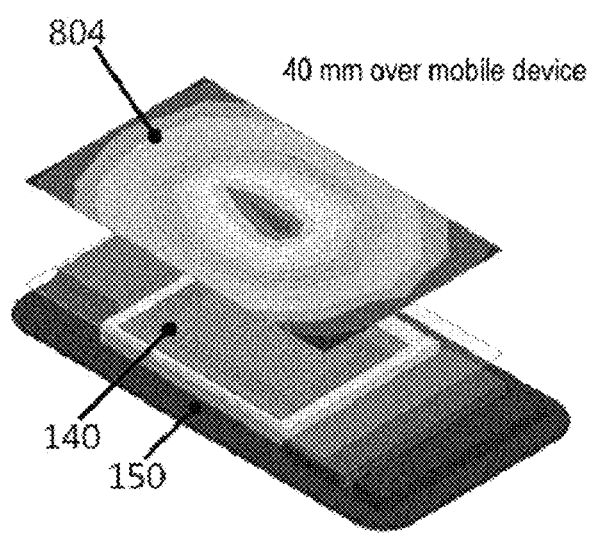

FIG. 11 illustrates distribution of magnetic field Z-components along the axis orthogonal to the mobile communication device 150 according to an embodiment of the present disclosure. Distributions of magnetic field generated by NFC inductor 140 are constructed for two cases:
   201—field amplitude without WPR receiver; and
   202—field amplitude with WPR receiver and compensator 130 under ferrite shield 120.

FIGS. 12A, 12B, 12C, and 12D illustrate magnetic field distribution in a plane parallel to surface of the mobile communication device 150 according to various embodiments of the present disclosure (in each of FIGS. 12A to 12D, dark color in the plane center shows areas with greater magnetic field, while light color shows areas with smaller magnetic field). The following cases are considered:
   801—field amplitude of NFC inductor 140 with WPR receiver and compensator 130 under ferrite shield 120 at the distance of 10 mm above the surface of the mobile communication device 150;
   802—field amplitude of NFC inductor 140 without WPR receiver at the distance of 10 mm above the surface of the mobile communication device 150;
   803—field amplitude of NFC inductor 140 with WPR receiver and compensator 130 under ferrite shield 120 at the distance of 40 mm above the surface of the mobile communication device 150; and
   804—field amplitude of NFC inductor 140 without WPR receiver at the distance of 40 mm above the surface of the mobile communication device 150.

Figure 13A:
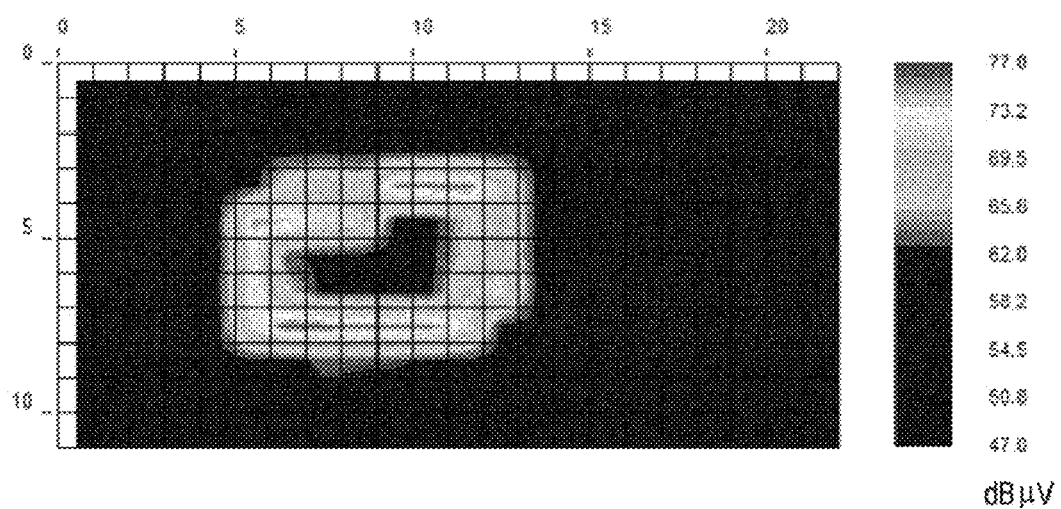
FIGS. 13A and 13B show experimental measurement results for magnetic field distribution in a plane parallel to the mobile device surface according to various embodiments of the present disclosure.
Figure 13B:
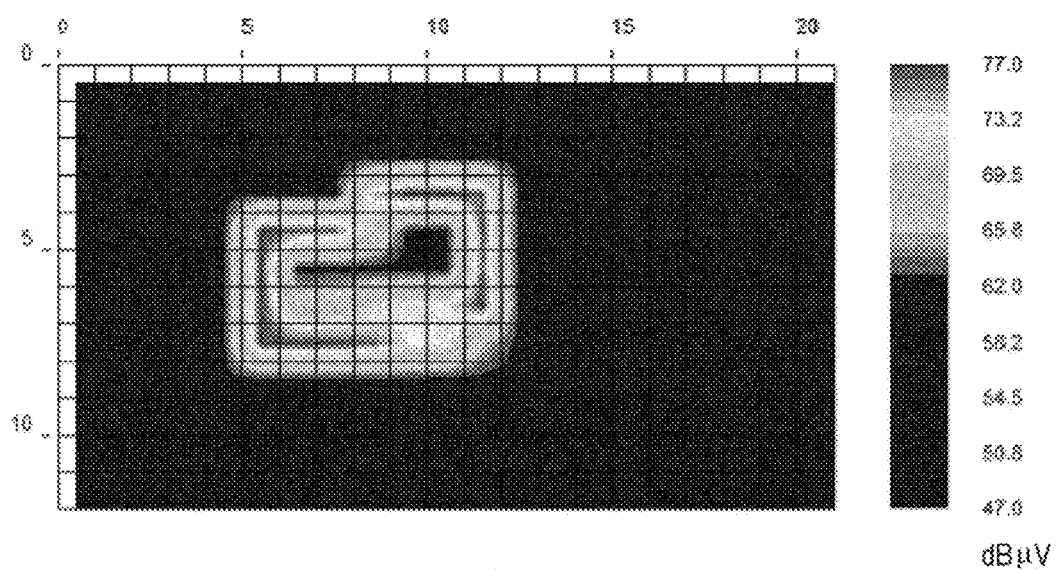

FIGS. 13A and 13B illustrate experimental measurement results at the frequency of 13.56 MHz for magnetic field distribution in a plane parallel to the mobile communication device 150 according to various embodiments of the present disclosure.

The following cases are considered:
   FIG. 13A—field amplitude of NFC inductor 140 without WPR receiver at the distance of 10 mm above the surface of the mobile communication device 150; and
   FIG. 13B—field amplitude of NFC inductor 140 with WPR receiver and compensator 130 above ferrite shield 120 at the distance of 10 mm above the surface of the mobile communication device 150.

The measurements were taken using an EMxpert™ magnetic near field measurement unit from EMS can.

According to the presented data, in FIGS. 10 to 13B, field amplitude of the NFC inductor 140 decreases by not more than 10% of the initial value for all distances above the surface of the mobile communication device 150. Therefore, the effect of WPR receiver placed above NFC inductor 140 is compensated by the presence of compensator 130.

The method can be used for designing mobile devices with wireless power supply function. The present disclosure describes a removable lid of a device with WPR function, which is applicable for all types of mobile devices and batteries with or without NFC units integrated in mobile communications devices. In accordance with the present disclosure, inductors for an NFC unit and a WPR receiver can be designed separately without mutual agreement. Coexistence of WPR and NFC components and effective functioning of them is achieved by the design of the compensator for grading the NFC inductor.

WPR and NFC components can effectively function both individually and together when WPR receiver is above NFC inductor.

Minimum possible thickness of a mobile communication device can be achieved through plane-parallel arrangement of WPR inductor, ferrite shield and compensator in contact with each other.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A mobile communication device comprising:
    a wireless communications device configured to transmit and receive data using a first inductor;
    a wireless power receiver configured to receive power wirelessly using a second inductor disposed above the first inductor;
    a shield for magnetic shielding configured to be disposed between the first inductor and the second inductor; and
    a compensator configured to:
        be disposed between the first inductor and the shield, and
        compensate for inductance of the first inductor,
    wherein the compensator compensates the inductance of the first inductor to an initial value by generating a magnetic field having a direction opposite to a magnetic field generated by the first inductor.

2. The mobile communication device of claim 1, wherein the first inductor and the second inductor are formed in a plate.

3. The mobile communication device of claim 1,
    wherein the shield has an internal space where a magnetic field generated from the first inductor is passed, and
    wherein an internal space in the shield is located corresponding to the first inductor.

4. The mobile communication device of claim 3, wherein dimensions of the internal space in the shield are smaller than outer dimensions of the first inductor, and larger than internal dimensions of the first inductor.

5. The mobile communication device of claim 1,
    wherein the compensator has an internal space where a magnetic field generated from the first inductor is passed, and
    wherein the internal space in the compensator is located corresponding to the first inductor.

6. The mobile communication device of claim 5, wherein dimensions of the internal space in the compensator is a maximum size which completely isolates the mobile communication device from a magnetic field of the second inductor.

7. The mobile communication device of claim 5, wherein distances between edges of the internal space in the compensator and external edges of the first inductor are determined based on a condition of constancy of the first inductor.

8. The mobile communication device of claim 1, wherein dimensions of the compensator are larger than dimensions of the shield.

9. The mobile communication device of claim 1, wherein the compensator is formed of a copper foil having a thickness of 10-50 µm.

10. The mobile communication device of claim 1, wherein the compensator is made of a conductive material.

11. The mobile communication device of claim 10, wherein the conductive material is copper or aluminum.

12. The mobile communication device of claim 1, further comprising a battery, wherein the first inductor is mounted on the battery.

13. The mobile communication device of claim 12, further comprising:
    a sheet configured to:
        be disposed between the battery and the first inductor, and
        prevent a change of magnetic field of the first inductor by the battery.

14. The mobile communication device of claim 1, further comprising:
    a removable lid,
    wherein the wireless power receiver, the shield and the compensator are mounted on the inner surface of the removable lid.

15. The mobile communication device of claim 1, wherein the wireless communications device and the wireless power receiver are adapted to operate at a different frequency.

16. The mobile communication device of claim 15, wherein the wireless communications device is adapted to operate at a frequency of 13.56 Megahertz (MHz), and the wireless power receiver is adapted to operate at a frequency of 6.78 MHz.

17. The mobile communication device of claim 1, wherein the wireless communications device performs a communication based on Near Field Communication (NFC) technology.

* * * * *